June 15, 1954   A. C. HIRSCH   2,681,103
BIAS CUTTER WIDTH CONTROL
Filed May 15, 1951   6 Sheets-Sheet 1

INVENTOR.
ALF C. HIRSCH
BY James J. Long
    Agent

June 15, 1954  A. C. HIRSCH  2,681,103
BIAS CUTTER WIDTH CONTROL

Filed May 15, 1951 6 Sheets-Sheet 2

INVENTOR.
ALF C. HIRSCH
BY James J. Long
Agent

June 15, 1954  A. C. HIRSCH  2,681,103
BIAS CUTTER WIDTH CONTROL
Filed May 15, 1951  6 Sheets-Sheet 3

INVENTOR.
ALF C. HIRSCH
BY James J. Long
Agent

June 15, 1954    A. C. HIRSCH    2,681,103
BIAS CUTTER WIDTH CONTROL
Filed May 15, 1951    6 Sheets-Sheet 4

INVENTOR.
ALF C. HIRSCH
BY James J. Long
agent

June 15, 1954   A. C. HIRSCH   2,681,103
BIAS CUTTER WIDTH CONTROL

Filed May 15, 1951   6 Sheets-Sheet 5

INVENTOR.
ALF C. HIRSCH
BY James J. Long
Agent

June 15, 1954  A. C. HIRSCH  2,681,103
BIAS CUTTER WIDTH CONTROL

Filed May 15, 1951  6 Sheets-Sheet 6

INVENTOR.
ALF C. HIRSCH
BY James J. Long
Agent

Patented June 15, 1954

2,681,103

UNITED STATES PATENT OFFICE 2,681,103

BIAS CUTTER WIDTH CONTROL

Alf C. Hirsch, Eau Claire, Wis., assignor to United States Rubber Company, New York, N. Y., a corporation of New Jersey Application May 15, 1951, Serial No. 226,413

9 Claims. (Cl. 164—34)

This invention relates to an improved bias cutter, and more particularly it relates to an improved means for establishing the width of the cut piece on a bias cutter for tire fabric and the like.

One object of the invention is to provide a simplified means for accurately determining the width of cut pieces obtained from a cutter designed to cut strips of a desired width on a bias from a continuous length of such material as tire fabric.

Another object is the provision of an improved device for setting and indicating the width of cut on a bias cutter.

Still another object is to provide for adjustment and indication of the width of the cut piece independently of the angle at which the piece is cut.

A further object of the invention is the provision of cooperating width adjusting means and angle adjusting means which determine the correct cutting angle of the fabric independently of changes in the width of the cut piece, and vice versa.

Figure 1:
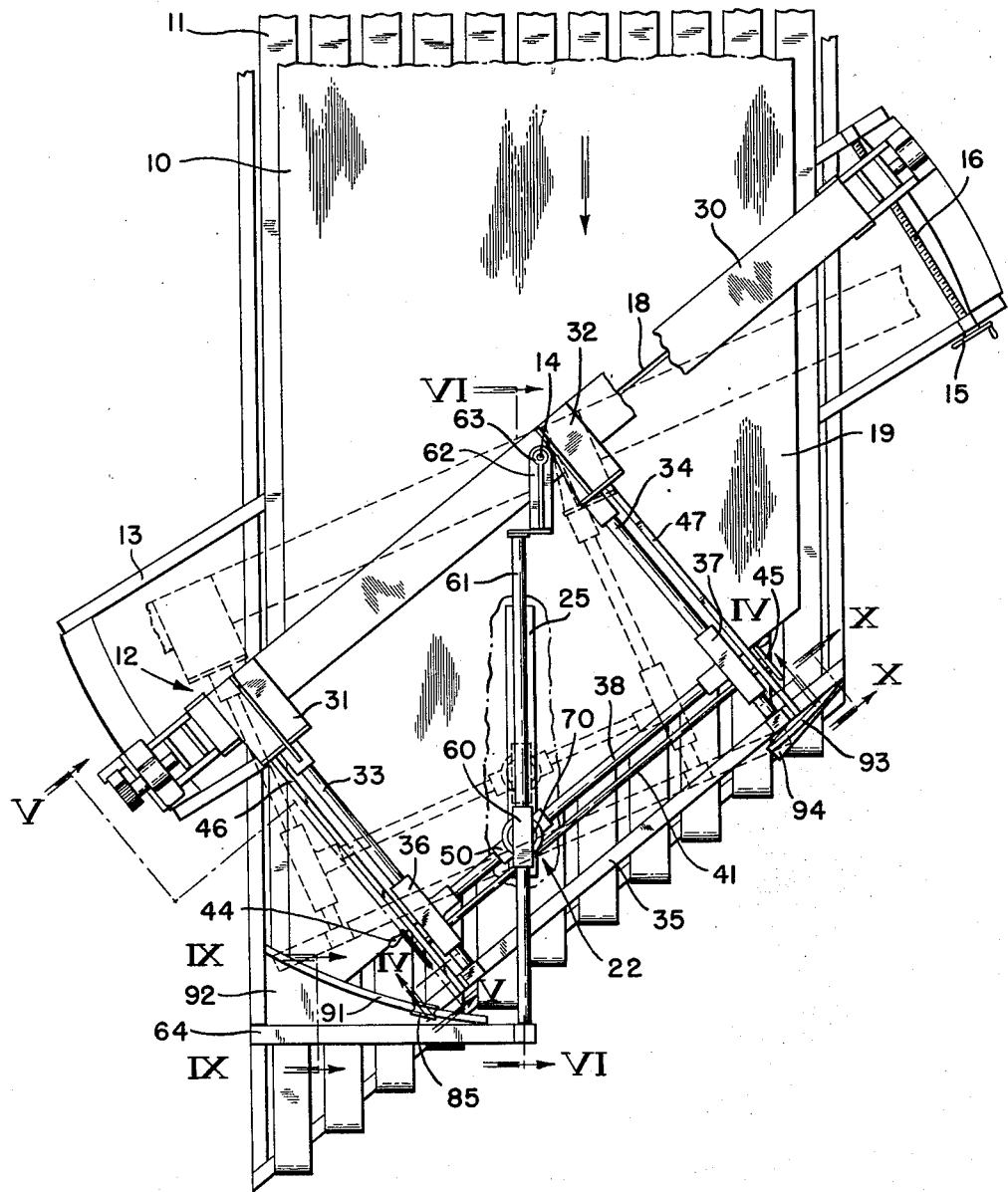
Figure 2:
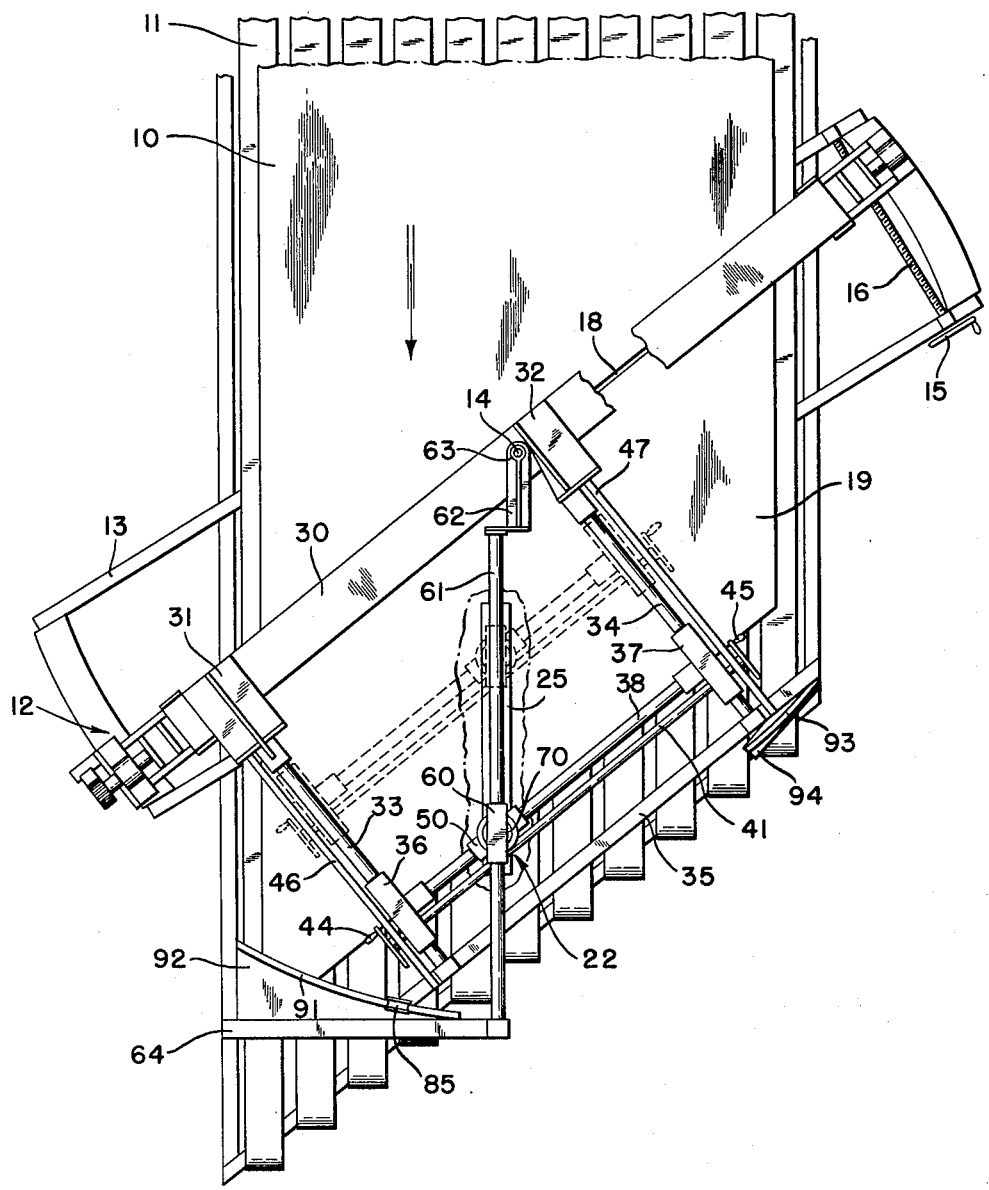
Figure 3:
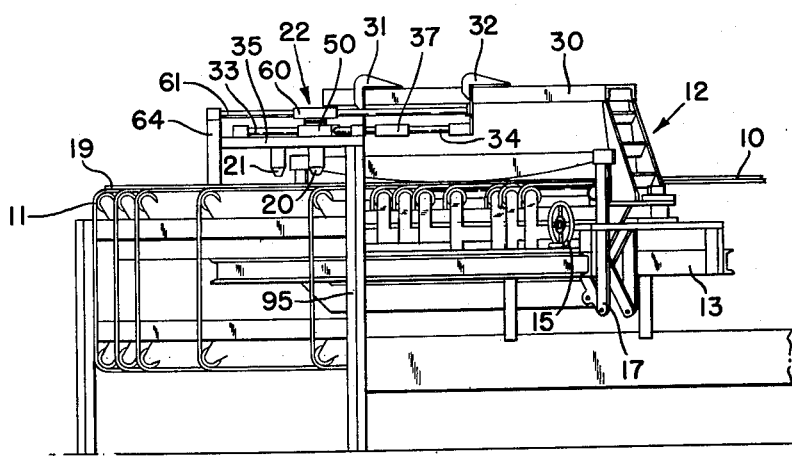
Figure 4:
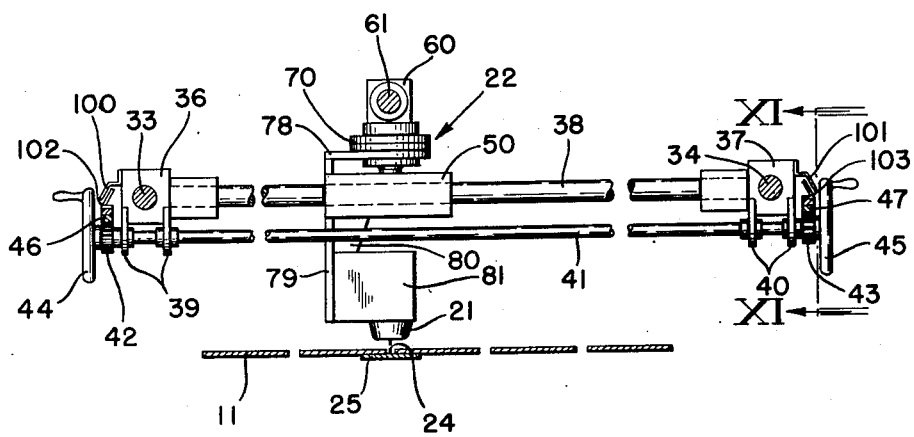
Figure 5:
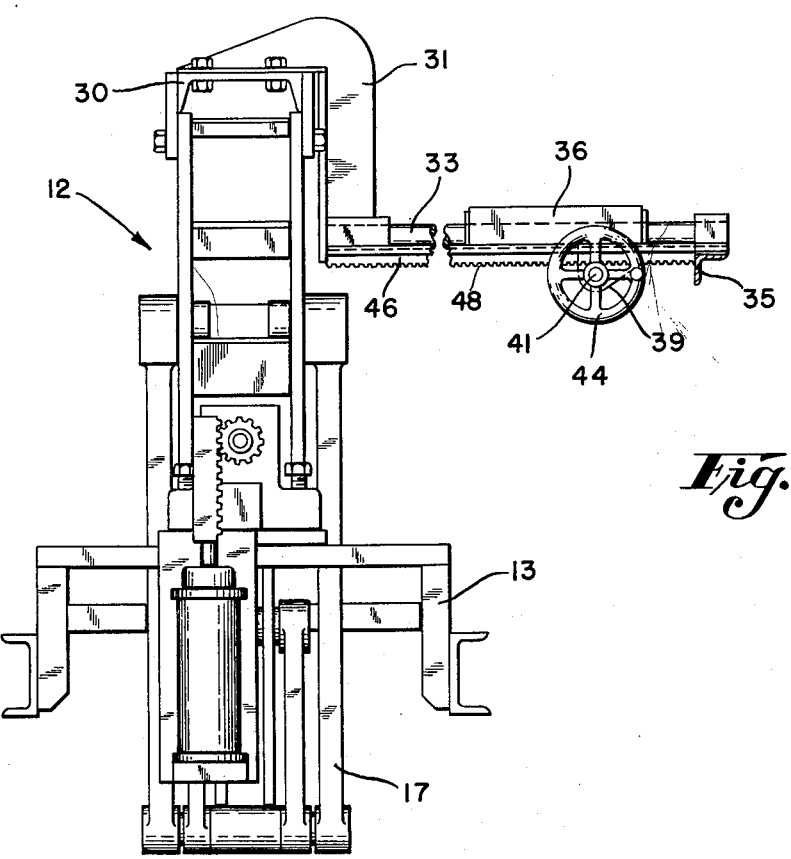
Figure 6:
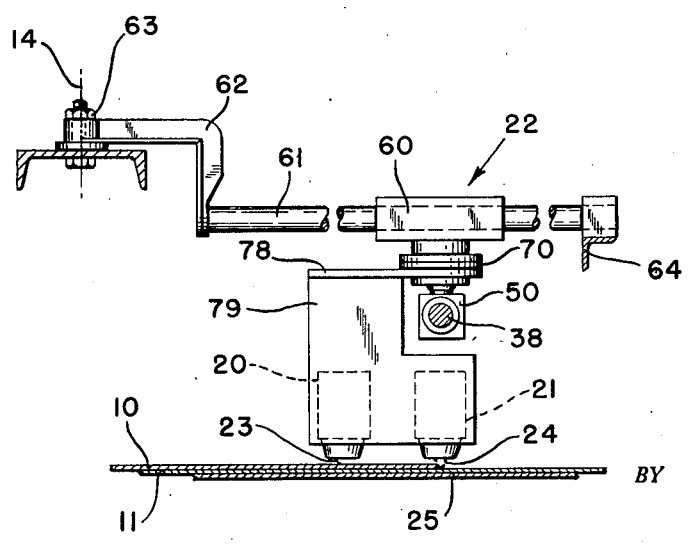
Figure 7:
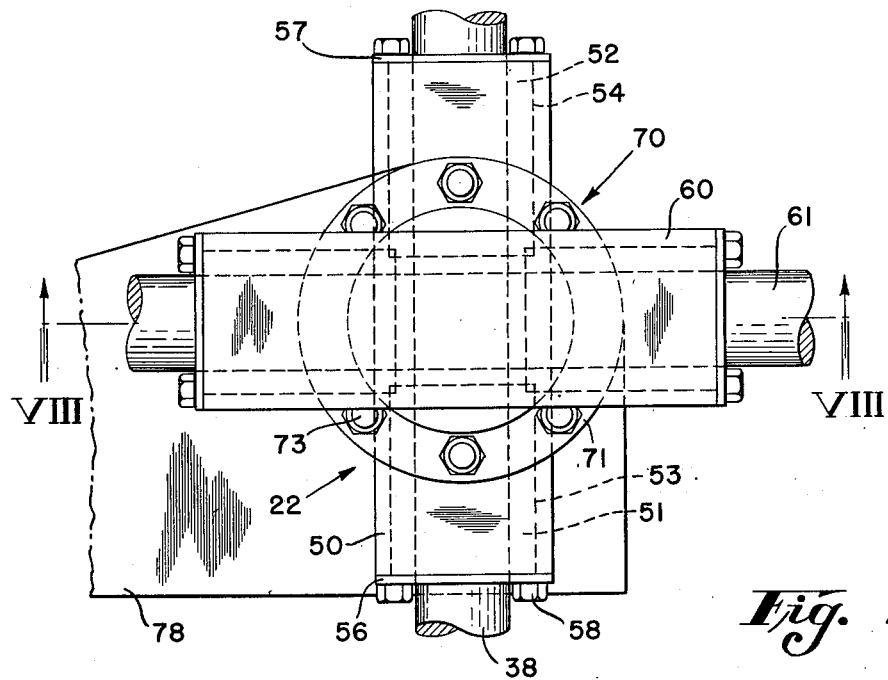
Figure 8:
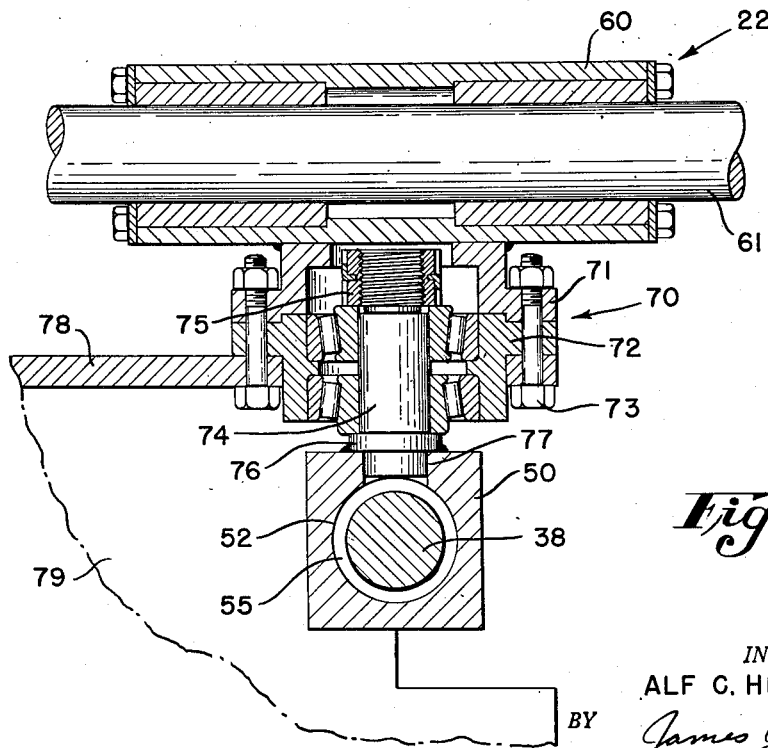
Figure 9:
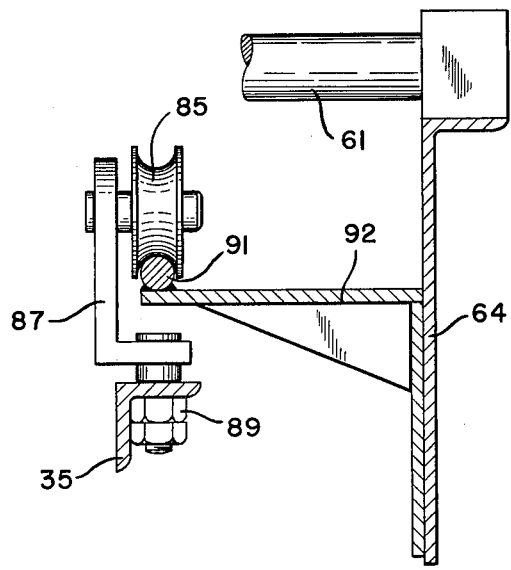
Figure 10:
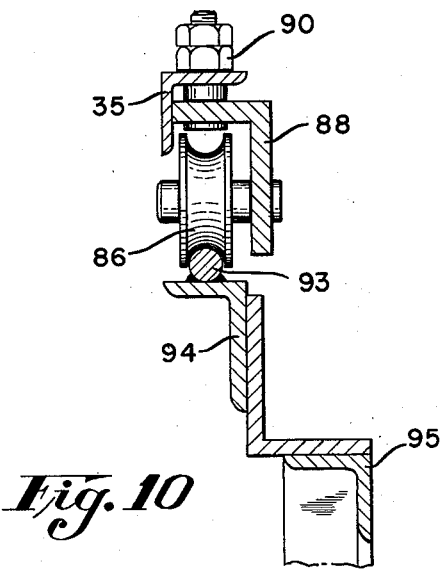
Figure 11:
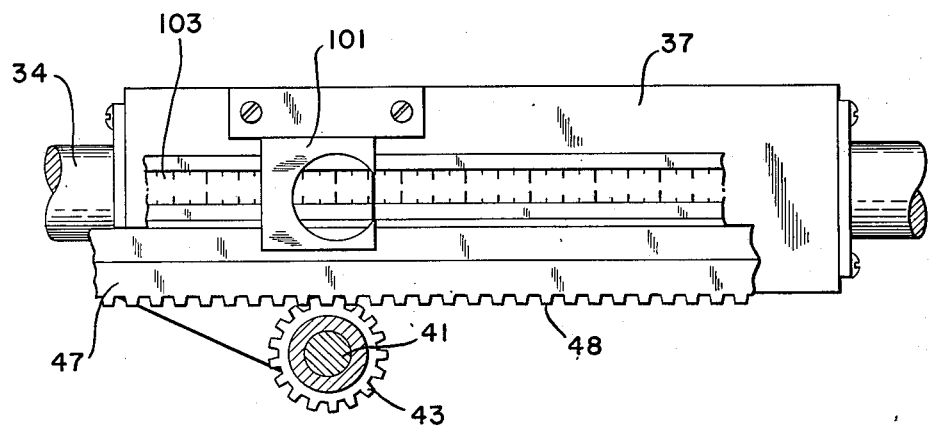

The manner in which the invention accomplishes the foregoing objects, as well as additional objects and advantages, will be made manifest in the following detailed description, which is intended to be read with reference to the accompanying drawings, wherein Fig. 1 is a plan view, with parts broken away, of a bias cutter embodying a width control constructed according to the invention, Fig. 2 is a similar view, indicating by dotted lines the movement of the width-controlling mechanism, Fig. 3 is a partial side elevational view of the machine of Figs. 1 and 2, Fig. 4 is a fragmentary elevational view of a portion of the machine on a larger scale with parts broken away and parts in section taken along the line IV—IV of Fig. 1, Fig. 5 is a fragmentary side elevational view of the machine taken along the line V—V of Fig. 1, Fig. 6 is a fragmentary elevational view of the machine taken along line VI—VI of Fig. 1, Fig. 7 is a fragmentary plan view on a larger scale of the width-controlling means, Fig. 8 is a fragmentary sectional view taken along line VIII—VIII of Fig. 7, Figs. 9 and 10 are detailed fragmentary sectional views of portions of the machine on a larger scale, taken along lines IX—IX and X—X of Fig. 1; and Fig. 11 is a detailed fragmentary elevational view of a portion of the width-adjusting means showing the width-of-cut indicator.

The invention is intended to be embodied in an adjustable automatic bias cutter having the usual means for feeding a continuous length of tire fabric to a cutting mechanism disposed generally transverse to the path of travel of the fabric on a bias at a variable angle, such as is described in the copending patent application of George F. Wikle, Serial No. 193,323, filed November 1, 1950 and assigned to the same assignee as the instant application. The invention contemplates supporting a width of cut controlling mechanism beyond the cutting mechanism in the direction of travel of the fabric at a definite desired distance measured in the plane of the fabric on a line perpendicular to the line of cut. Such controlling mechanism is so supported that as the angle of cut is varied, the position of the control mechanism is automatically adjusted to preserve the desired width of cut, without disturbing the alignment of the controlling mechanism longitudinally of the path of travel of the fabric.

Referring to the drawing, Fig. 1 shows a portion of a bias cutter of the type disclosed in copending application Serial No. 193,323 referred to previously. In this machine, tire fabric 10, comprising parallel textile cords running lengthwise of the fabric and skim coated on each side with a thin layer of vulcanizable rubber stock, is carried along in a horizontal plane, in the direction indicated by the arrow in Fig. 1, on the upper surface of intermittently fed parallel conveyor bands 11, all as described in application Serial No. 193,323. The cutting mechanism 12, which may be of any suitable type, such as that described in detail in application Serial No. 193,323, is disposed above the fabric and extends generally transversely on a bias to the direction of the travel of the fabric. The cutter 12 is so mounted on a framework 13 that it is enabled to pivot about a pivot point 14, located at the center line of the fabric, by turning a hand wheel 15 on the end of a shaft 16 rotatably mounted at one end of the frame 13 and threaded through one end of the cutting assembly 12, for the purpose of adjusting the angle of the cut to the desired value, as indicated by the dotted lines in Fig. 1. The cutter 12 includes a linkage mechanism 17 (Figs. 3 and 5) by which it is actuated intermittently as described in application Serial No. 193,323, producing an angular cut 18 in the fabric, and the resulting cut width 19 of fabric may be removed from the conveyor bands 11 by hand at the delivery end of the machine.

The operation of the cutter 12 is controlled electrically with the aid of two spaced photoelectric switches 20 and 21 (Fig. 6) which are mounted as a unit, in a manner to be described below, on the underside of a sliding swivel mounting assembly 22 that is supported above the plane of the fabric 10 at a spaced distance from the cutter 12 in the direction of travel of the fabric. The photo switches 20 and 21 are electrically connected to the driving means for the conveyor bands 11 and to the actuating means for the cutter 12 in the manner described in application Serial No. 193,323. Each of the photo switches 20 and 21 directs a beam of light 23, 24 (Fig. 6) downwardly onto an elongated mirror 25 suitably supported below the plane of the fabric 10 between two of the conveyor bands 11, whereby such light beams are reflected back into and energize the respective photo switches. When the fabric 10 is moved across the face of the mirror 25 on the conveyor bands 11, the light beams are interrupted, thereby actuating the photo switches. The operation of the photo switches, as set forth in detail in application Serial No. 193,323, is such that the first photo switch, that is, photo switch 20 located nearest to the cutter 12, controls the speed of the conveyor belts 11 in such manner that when the fabric 10 moves into position below this switch, thereby interrupting the light beam 23, the speed of the conveyor is immediately reduced so that the fabric continues to advance toward the second photo switch 21 at a relatively slow speed. As the fabric 10 arrives at the second photo switch 21, interrupting the light beam 24, this switch immediately stops the conveyor bands 11 so that the fabric 10 comes to rest in this position, and this switch also causes the cutter 12 to act, so that a cut 18 is made in the fabric. As the operator removes the resulting cut piece 19 from the end of the conveyor, the light beams 23 and 24 are again enabled to strike the mirror 25 and are reflected back into the respective photo switches 20 and 21. The electrical control circuit for the machine is such that when the photo switches 20 and 21 are again energized in this manner, the conveyor bands 11 again move forward at high speed, carrying another length of fabric 10 into position below the photo switch, whereupon the foregoing cycle is again repeated.

It will be understood from the foregoing that the cutting operation is automatically controlled by the photo switches 20 and 21 in such manner that the fabric 10 is intermittently moved forward and cut into equal widths, and the width of the cut piece is determined by the distance between the photo switches and the cutter. Specifically, the width of the cut piece is equal to the distance between the cutter and the second photo switch 21, which stops the conveyor and actuates the cutter. Therefore, in order to adjust the machine for a desired width of cut, it is necessary to provide for proper variation of the distance between the cutter and the photo switch assembly.

In order to provide for adjustment of the distance between the photo switches and the cutter while at the same time preserving such adjustment as the angle of the cutter 12 is varied, the photo switch swivel mounting 22 is slidably mounted on an assembly secured to the cutter 12 in a manner now to be described. A beam 30 secured on top of the cutter 12 carries spaced brackets 31 and 32 which extend outwardly perpendicularly from the beam 30 in the direction of travel of the fabric and downwardly toward the plane of the conveyor belts 11. Parallel guide rods 33 and 34 extend outwardly from the lower extremities of the brackets 31 and 32 respectively and are secured at their outer extremities by suitable brackets to the upper surface of a transverse angle iron 35 that is parallel to the cutter 12 and the beam 30. Each of the guide rods 33, 34 carries an oppositely disposed sliding sleeve bracket 36, 37 and a transverse guide bar 38 extends across from one of the sleeve brackets to the other.

As indicated in Fig. 4 the lower portion of each of the sleeve brackets 36, 37 carries a pair of downwardly extending spaced bearing supports 39 and 40, respectively, and a pinion shaft 41 extends rotatably through such bearing supports from one side of the assembly to the other. Near the outer side of each of the sleeve brackets 36, 37 there are secured on each extremity of the pinion shaft 41, pinion gears 42 and 43, as well as hand wheels 44 and 45 respectively. Cooperating elongated racks 46 and 47 arranged parallel to the guide rods 33 and 34 at the outer sides thereof are secured at one end to the brackets 31, 32 and at the other end to the angle iron 35, and have teeth 48 (Figs. 5 and 11) on their lower surface engaging the teeth of the pinion gears 42, 43 respectively.

The transverse guide rod 38 passes slidably through a surrounding sleeve like box arrangement 50 of the photo switch support assembly 22, comprising, as indicated most clearly in Figs. 7 and 8, cylindrical bearing sleeves 51 and 52 held in place in recesses 53 and 54 at each end of a transverse passageway 55 through the box 50 by end plates 56 and 57 secured thereto by screws 58.

A similar upper sleeve box 60 disposed generally transversely of the sleeve box 50 accommodates slidably a horizontal guide rod 61 that passes longitudinally over the machine. The guide rod 61 carries at one end a bracket 62 (Figs. 1 and 6) whereby it is pivotally secured to the upper beam 30 of the cutter 12 by a nut and bolt 63 located at the pivotal axis 14 of the cutter assembly. At its other end the guide rod 61 is rigidly fastened in the upper portion 64 of the machine framework.

The upper sleeve box 60 and lower sleeve box 50 are pivotally secured together by means of a bearing assembly 70, comprising a flange 71 (Figs. 7 and 8) fastened to the bottom of the upper sleeve box 60 and secured to a roller bearing unit 72 by bolts 73 passing through a flange on the edge thereof. A central vertical shaft 74 is rotatably supported within the roller bearing 72 and secured in place thereon by a nut 75 on the threaded upper end of the shaft, and by an enlarged flange 76 toward the lower end of the shaft that engages the under surface of the central portion of the roller bearing 72. The lower sleeve box 50 has on its upper surface the circular recess 77 for receiving the lower end of the shaft 74, which is suitably secured to the lower sleeve box 50, as by welding.

A horizontal bracket plate 78 is also secured to the bearing assembly 70 by the bolts 73, and this horizontal plate has securely attached thereto, as by welding, downwardly extending vertical plates 79 and 80 (Fig. 4) which in turn support a housing 81 for the photo switch units 20 and 21. The assembly is such that the rotatable vertical shaft 74 and the lower bearing box 50 rigidly secured thereto are enabled to rotate as a unit with respect to the photo switch support plate 78, the outer casing of the roller bearing unit 72, and the upward flange 71, all of which are rigidly held together by the bolt 73, and which are also rigidly attached to the upper sleeve box 60.

To further support the assembly of guide rods 33, 34 and transverse angle iron 35, while permitting angular movement of the entire assembly as the angle of the cutter is changed, there are provided, at each end of the angle iron 35, casters 85 and 86 (Figs. 9 and 10) having concave rolling faces. The caster 85 is rotatably supported on an angular bracket 87 extending upwardly from the angle iron 35 and pivotally secured thereto by a suitable bolt and nut arrangement 89, while the opposite caster 86 is rotatably supported on a similar angle piece 88 extending downwardly from the angle iron 35 and also pivotally secured thereto by a suitable nut and bolt arrangement 90. The caster 85 rides on a track comprising a round rod 91 arranged in a curved path along the edge of a horizontal supporting plate 92 that is rigidly mounted in the upper end framework 64 toward one side of the end of the machine. The other caster 86 rides on a similar track 93 supported on the upper surface of an angle iron 94 mounted on the top of a suitable frame member 95 extending upwardly at the other side of the machine. Each of the curved tracks 91 and 96 has as its center of curvature the center pivotal axis 14 of the cutting assembly, so that as the angle of the cutting assembly is changed by turning the hand wheel 15, the entire assembly is guided and steadied in the proper curved path on the casters 85 and 86.

Adjustment of the width of cut is effected by turning either of the handles 44 or 45, causing the sleeves 36 and 37 to be transported by the action of the pinions 42 and 43 on the racks 46 and 47, and thereby also simultaneously transporting the transverse guide rod 38 and the photo switch swivel mounting 22 as a unit to a position closer to or farther from the cutter 12, depending on the direction of rotation of the hand wheel. Such adjusting movement is indicated by the dotted lines in Fig. 2. Pointers 100 and 101 (Fig. 4) extend outwardly and downwardly from the outer side of each of the sleeves 36 and 37 across the face of suitably graduated scales 102 and 103 which are fixed to the top of the racks 46 and 47, respectively, and serve to indicate the width of the cut, that is, the distance between the cutter and the second photo switch 21.

In operation, the fabric 10 is fed along on the conveyor bands 11 past the cutter 12 toward the photo switch assembly 22. As the edge of the fabric reaches the first photo switch 20, the conveyor bands 11 are automatically slowed down in the manner described in detail in application Serial No. 193,323, and thereafter the fabric advances slowly to the second photo switch 21, which causes the conveyor bands 11 to stop, and then causes the cutter 12 to cut the stationary fabric as at 18. The operator then removes the resulting cut piece 19 from the end of the conveyor, thereby again permitting the light beams 23 and 24 to be reflected from the mirror 25 back into the photo switches 20 and 21 respectively, and causing the conveyor bands 11 to move another length of fabric into position for the next cutting operation.

To set the cutter 12 at a desired angle with respect to the fabric 10 the hand wheel 15 is turned to rotate the threaded shaft 16, causing the cutter 12 to turn with respect to its supporting frame 13 about a pivot point 14. As the angle of cut is changed in this manner, the entire carriage framework comprised of parallel guide rods 33 and 34 and transverse angle iron 35 will also rotate as a unit on the casters 85 and 86 riding on the stationary curved tracks 91 and 96, about the pivot point 14, as indicated by the dotted line in Fig. 1. As a result of this rotation, the photo switch swivel assembly 22 will slide in the appropriate direction on the longitudinal stationary guide rod 61 passing slidably through the upper sleeve box 60 of the swivel assembly 22. This sliding movement of the upper sleeve box 60 is accompanied by a relative rotation of the vertical shaft 74 of the bearing assembly 70 carrying the lower sleeve box 50 on the transverse guide shaft 38. Simultaneously with the sliding movement of the upper sleeve box 60 on the longitudinal guide rod 61 there will be a corresponding sliding movement of the lower sleeve box 50 on the transverse guide rod 38. Although during the angle adjusting movement the upper and lower sleeve boxes 60 and 50 slide on their respective guide rods 61 and 38, with accompanying relative rotation of the lower sleeve box relative to the upper sleeve box 60 to which the photo switches are rigidly secured, the distance between the photo switches and the cutter 12 nevertheless remains constant because such distance is determined by the position of the guide rod 38 with respect to the cutter 12, and this relative position remains constant even as the angle of the entire cutting assembly is varied as a unit. Also, it will be noted that both of the photo switch units 20 and 21 remain longitudinally aligned in the line of travel of the fabric, because the photo switch units are rigidly attached to the upper sleeve box 60 on the longitudinal guide rod 61 which is fixed to the framework of the machine in such manner as to always maintain its longitudinal alignment. Such width adjusting movement of the photo switch assembly 22 is also accompanied by a sliding movement of the upper sleeve box 60 on the longitudinal guide rod 61, as well as a sliding movement of the lower sleeve box 50 on the transverse guide rod 38. This width adjusting movement is not accompanied by any change in the angle of cut because the cutter 12 itself remains stationary during the movements described. Also the width adjusting movement does not disturb the operative alignment of the photo switch assembly with the mirror under the conveyor, because the longitudinal guide rod 61 maintains the assembly in longitudinal alignment at all times.

The operation of adjusting the width of the cut is accomplished, as indicated previously, by turning either of the hand wheels 44, 45 causing the rack and pinion arrangements 42, 46 and 43, 47 to slide the sleeve members 36, 34 on the parallel guide rods 33, 34 and thereby transporting the transverse guide rod 38 and the photo switch assembly 22 as a unit nearer to or farther from the cutter 12, as indicated by the dotted line in Fig. 2. It will also be noted that because the width of cutter is determined solely by the distance between the transverse guide rod 38 and the cutter, the graduated scales 102 and 103 will always indicate the correct width of the cut regardless of the angular disposition of the cutter assembly. Also, because the longitudinal guide rod 61 maintains the photo switch assembly in proper longitudinal alignment during the adjusting movement, the photo switches are also necessarily maintained in operative longitudinal alignment with the mirror 25 at all times, regardless of the angle of cut.

From the foregoing it will be seen that the invention provides for convenient adjustment of the angle-of-cut and of the width-of-cut independently of each other, and a change in the one has no effect on the other. Also, the photo cell control unit is maintained in proper longitudinal alignment with the cooperative mirror at all times irrespective of changes in either the angle-of-cut or the width-of-cut. Since a change in the angle-of-cut does not affect the perpendicular distance from the cutter to the photo switch unit, the true width-of-cut is readily and correctly indicated at all angles by the scale which indicates this distance.

Having thus described my invention, what I claim and desire to protect by Letters Patent is:

1. In an automatic bias cutter having a cut actuating control spaced from a cutting assembly for controlling the width of a cut, the improvement which comprises a support for said cut actuating control, a mounting on which said support is slidably mounted for movement longitudinally of the cutter, said support being pivotally connected to a second support mounted on a support which is mounted for movement perpendicular to the said cutting assembly.

2. In a bias cutter having a cutting mechanism disposed transversely across a conveyor on a bias and a controller for actuating said cutter, the improvement which comprises a guiding means extending longitudinally of the conveyor on which said controller is mounted for longitudinal movement, and a guiding means extending perpendicularly of the cutting mechanism on which said controller is mounted for simultaneous movement on a support which moves perpendicular to the cutting mechanism.

3. In a bias cutter having a conveyor for advancing a fabric longitudinally past a cutting mechanism disposed at a variable angle transversely of the path of the conveyor and having a control means spaced a variable distance from the cutting mechanism for determining the width of a cut piece of fabric, the improvement which comprises a guiding means extending perpendicularly from said cutting mechanism for supporting said control means at a variable distance from said cutting mechanism, in combination with a guide means extending longitudinally of the conveyor for maintaining said control means in longitudinal alignment with said conveyor.

4. In a bias cutter having a conveyor for advancing a fabric longitudinally past a cutting mechanism disposed at a variable angle transversely of the path of the conveyor and having a control means spaced a variable distance from the cutting mechanism for determining the width of a cut piece of fabric, the improvement which comprises a first support extending longitudinally of the conveyor, a first bracket for said controlling means slidably mounted on said support, a further support extending from said cutting mechanism, a second bracket mounted on said further support, means for moving said further support in a direction perpendicular to said cutting mechanism, and a pivotal connection between said first bracket and said second bracket, whereby said controlling means is maintained in longitudinal alignment during said pendendicular movement.

5. In a bias cutter having a conveyor for advancing a fabric longitudinally past a cutting mechanism disposed at a variable angle transversely of the path of the conveyor and having a control means spaced a variable distance from the cutting mechanism for determining the width of a cut piece of fabric, the improvement which comprises a guide rod extending longitudinally of the conveyor, a bracket slidably mounted on said guide rod for supporting said control means, a pair of parallel guide rods extending perpendicularly of said cutting mechanism, a further guide rod extending transversely of said parallel guide rods and slidably mounted thereon, means for moving said transverse guide rod on said parallel guide rods in a direction perpendicular to said cutting mechanism, a sleeve slidably mounted on said transverse guide rod, and a pivotal connection between said sleeve and said bracket.

6. In a bias cutter having a conveyor for advancing a fabric longitudinally past a cutting mechanism mounted transversely of said conveyor at a variable angle and having a control means spaced a variable distance from the cutting mechanism including a photo switch unit and a cooperating mirror disposed longitudinally of the conveyor, the improvement which comprises a guiding means extending longitudinally of the conveyor, a support slidably mounted on said guiding means for supporting said photo switch unit, a further guiding means extending parallel to said cutting mechanism, a bracket slidably mounted on said further guiding means, a pivotal connection between said bracket and said support, and means for moving said bracket on said further guiding means perpendicularly of said cutting mechanism to vary the perpendicular distance between said cutting mechanism and said photo switch unit to determine the width of cut independently of the angular disposition of the cutting mechanism with respect to the conveyor, said pivotal connection between said bracket and said support on said longitudinal guiding means serving to maintain said photo switch unit in longitudinal alignment with said mirror independently of the angular disposition of the conveyor and independently of the perpendicular distance between the cutting mechanism and the photo switch unit.

7. In a bias cutter having a means for advancing a fabric longitudinally past a cutting mechanism disposed at a variable angle transversely of the path of the fabric and having a controlling means, for actuating the cutting mechanism, spaced a variable distance from the cutting mechanism, the improvement which comprises, a support for such controlling means, means for moving said support in a direction perpendicular to said cutting mechanism, and means for maintaining said controlling means in longitudinal alignment along the path of travel of the fabric independently of said perpendicular movement of said support.

8. In a bias cutter having a cutting mechanism disposable at various angles across the path of movement of the fabric to be cut, the improvement which comprises, a support extending from said cutting mechanism in the direction of travel of the fabric, control means for actuating the cutting mechanism mounted on said support and movable along said support, means interconnecting said cutting means and said control means for moving said control means along said support a predetermined distance when the angularity of said cutting means with respect to the path of movement of the fabric is varied a predetermined amount.

9. In a bias cutter having a cutting mechanism disposed at a variable acute angle across the path of a fabric to be cut, the improvement which comprises, a support extending from said cutting mechanism in the direction of travel of the fabric, control means for actuating the cutting mechanism mounted on said support and movable along said support, means movable in a direction perpendicular to said cutting means, means for moving said movable means, means interconnecting said movable means and said control means so that said control means are moved a predetermined distance along said support when said movable means is moved a predetermined distance in a direction perpendicular to said cutting means.

References Cited in the file of this patent

UNITED STATES PATENTS

| Number | Name | Date |
|---|---|---|
| 1,868,226 | Draher | July 19, 1932 |
| 2,581,937 | Secrest | Jan. 8, 1952 |